United States Patent [19]

Cook et al.

[11] Patent Number: 4,967,334
[45] Date of Patent: Oct. 30, 1990

[54] INVERTER INPUT/OUTPUT FILTER SYSTEM

[75] Inventors: Alexander Cook; John Dhyanchand, both of Rockford, Ill.; Rasappa Palaniappan, Michigan City, Ind.; Dwight Schmitt, Rockford, Ill.

[73] Assignee: Sundstrand Corporation, Rockford, Ill.

[21] Appl. No.: 406,263

[22] Filed: Sep. 12, 1989

[51] Int. Cl.[5] .................. H02M 1/12; H02M 1/14; H02M 5/42
[52] U.S. Cl. ..................................... 363/34; 307/105; 333/175; 363/40; 363/47
[58] Field of Search ............. 363/34, 36, 37, 38, 363/39, 40, 43, 47; 318/803; 333/175; 307/105

[56] References Cited

U.S. PATENT DOCUMENTS

| | | | |
|---|---|---|---|
| 2,241,832 | 5/1941 | Wahlquist | 307/105 |
| 3,461,372 | 1/1966 | Pickup et al. | |
| 3,681,612 | 8/1972 | Vogl et al. | 307/105 |
| 3,746,963 | 7/1973 | VeNard, II | |
| 4,760,231 | 7/1988 | Hayashi | 333/175 |
| 4,862,341 | 8/1989 | Cook | 363/37 |

FOREIGN PATENT DOCUMENTS

| | | | |
|---|---|---|---|
| 2257264 | 11/1972 | Fed. Rep. of Germany | 363/40 |
| 173667 | 8/1986 | Japan. | |
| WO85/01844 | 9/1984 | PCT Int'l Appl. | |

Primary Examiner—William H. Beha, Jr.
Attorney, Agent, or Firm—Marshall, O'Toole, Gerstein, Murray & Bicknell

[57]     ABSTRACT

A filter system for removing selected frequencies from AC power provided on at least two phase lines and a neutral line includes a phase-to-phase filter for removing a first selected AC component at a first frequency from the AC power wherein the frequency component has a line-to-phase displacement within first or second ranges. A phase-to-neutral filter is also provided for removing a second selected AC component at a second frequency different from the first frequency from the AC power wherein the second frequency component has a line-to-line phase displacement outside of the first and second ranges.

6 Claims, 4 Drawing Sheets 4,967,334

INVERTER INPUT/OUTPUT FILTER SYSTEM

TECHNICAL FIELD

The present invention relates generally to filters, and more particularly to a filter system for removing selected frequencies from AC power provided on at least two phase lines and a neutral line.

BACKGROUND ART

The use of filters to remove selected frequencies from AC power is well known. For example, a variable speed, constant frequency (VSCF) power generating system includes filters for removing harmonics from the system output power. In such a system, a DC link filter removes a ripple component from DC power provided on a DC link by a rectifier. Also, AC power produced by a controlled static inverter coupled to the DC link is filtered by filtering components to remove harmonics present in the inverter output so that a nearly sinusoidal output can be obtained.

Typically, inverters which are used in such VSCF systems are of the three-phase, four-wire type wherein three phase output voltages and a neutral are produced. The output filter in such a system is connected in a wye configuration wherein impedances are connected between each phase output and the neutral.

It has been found that the phase-to-phase displacement of each harmonic in the AC power produced by the inverter varies with the order of the harmonic. The variation in phase-to-phase displacement can render wye-connected or delta-connected filters inefficient or even ineffective to remove certain harmonics. This can in turn lead to the requirement for additional filtering components and/or larger and heavier components in the output filter.

VeNard II, U.S. Pat. No. 3,746,963, discloses the use of a DC filter coupled on a DC link between a rectifier output and an inverter input. The filter comprises a first capacitor coupled in parallel with a series combination of an inductor and a second capacitor. The filter is in turn coupled across two conductors of the DC link. The filter is tuned to a frequency equal to twice the output frequency of the inverter.

Pickup, et al., U.S. Pat. No. 3,461,372, discloses a DC to AC power converter comprising a transistor which is operated by a square wave input and a plurality of series resonant and parallel resonant filters coupled to the collector of the transistor. Even harmonics in the power produced at the collector of the transistor are attenuated by the series resonant filters while lower odd harmonics are blocked by the parallel resonant filters. A sinusoidal output is thereby produced at a frequency equal to the fundamental frequency of the square wave input to the transistor.

Hucker, PCT WO 85/01844 (assigned to the assignee of the present application) discloses a sine-wave resonant converter which produces a sine-wave output from DC power provided by a DC power supply. A series resonant circuit is coupled across the DC power supply and is tuned to twice the frequency of the inverter output to provide a low impedance path for AC current flowing to the power supply.

SUMMARY OF THE INVENTION

In accordance with the present invention, a filter system is capable of removing selected frequencies from AC power provided on AC power lines using relatively small and lightweight filter components.

More particularly, a filter system for removing selected frequencies from AC power provided on three phase lines and a neutral line includes a phase-to-phase filter for removing a first selected AC component at a first frequency from the AC power wherein the frequency component has a line-to-line phase displacement in one of first and second ranges wherein the first range is 120° + 30° and the second range is 240° + 30° and a phase-to-neutral filter for removing a second selected AC component at a second frequency different than the first frequency from the AC power wherein the second frequency component has a line-to-line phase displacement outside of the first and second ranges.

In the preferred embodiment, the filter system is particularly adapted for use in a VSCF system wherein a rectifier rectifies the variable frequency output of a generator and provides such rectified power over a DC link to an inverter which is controlled to produce constant frequency AC power. The filter system further includes a DC filter comprising first and second series-connected capacitors coupled across first and second inputs of the inverter wherein a junction between the capacitors is coupled either directly or through an inductor to the neutral line. In addition, an inductor may be coupled between a neutral connection of a neutral forming transformer coupled to the rectifier input and the neutral line. A third inductor may be coupled between the neutral line and a neutral of a load coupled to the power system.

In the preferred embodiment, the phase-to-phase filter comprises three separate delta-connected filters, each including three impedances coupled between the output phases of the inverter. In the preferred embodiment, the power system can be used in a generating mode in which motive power is transferred from a prime mover to an electrical load or in a starting mode in which electrical power is provided through the rectifier and the inverter to the prime mover to bring same up to self-sustaining speed. In this case, two of the deltaconnected filters are effective to remove certain harmonics during operation in the starting mode whereas the remaining delta-connected filter and the line to neutral filter remove frequency components present during operation in the generating mode.

The filter system of the present invention permits a reduction in the number, size and weight of the filtering components so that the size and weight of the overall power system is greatly reduced.

DESCRIPTION OF THE PREFERRED EMBODIMENT

Figure 1:
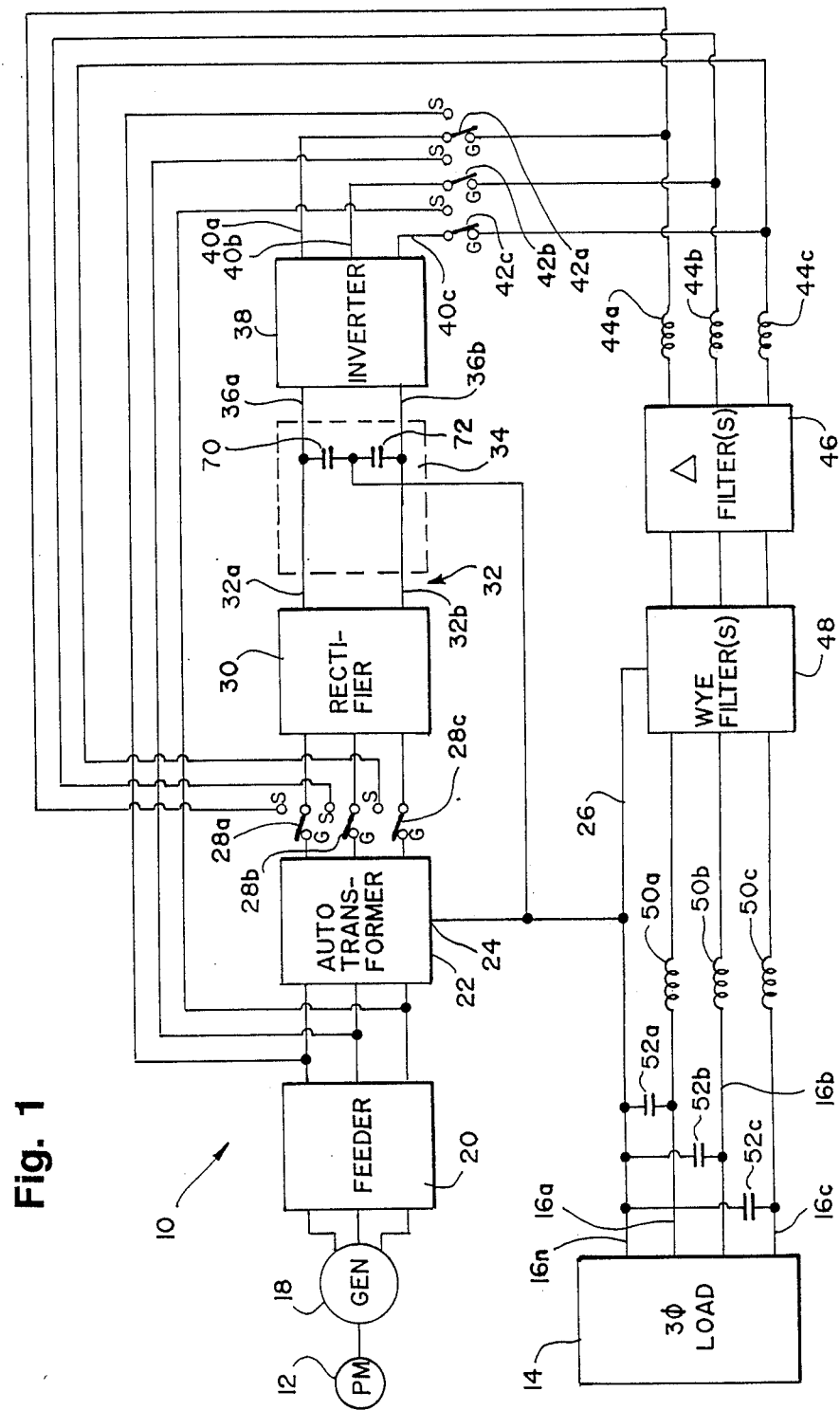
FIG. 1 comprises a combined block and schematic diagram of a power supply system incorporating a first embodiment of a filter system according to the present invention.

Referring now to FIG. 1, a variable speed, constant frequency (VSCF) system 10 converts variable speed motive power produced by a prime mover 12 into constant frequency AC power which is provided to one or more loads 14. In the embodiment of FIG. 1, the VSCF system is of the three-phase, four-wire type wherein three phase load voltages are provided on conductors 16a, 16b and 16c and a neutral load voltage is provided on a neutral conductor 16n. It should be noted that the VSCF system 10 may produce a different number of phase voltages, if desired.

The VSCF system 10 includes a brushless, synchronous generator 18 that develops variable frequency AC power and which is coupled to a feeder 22 and a neutral forming autotransformer 22. The autotransformer includes a neutral connection 24 which is coupled to a neutral line 26. The autotransformer 22 also includes three phase outputs which are coupled through controllable switches 28a, 28b and 28c to a full bridge rectifier 30. The rectifier 30 in turn develops DC power which is transferred by a DC link 32 comprising link conductors 32a, 32b to a DC link filter 34. The filter 34 is coupled through additional DC link conductors 36a, 36b to two inputs of a polyphase static inverter 38. The inverter 38 includes switches (not shown) which are operated to produce three-phase output power on three-phase inverter output lines 40a–40c. The output lines 40a–40c are coupled through a second set of controllable switches 42a–42c to a first set of series inductors 44a–44c. One or more sets of phase-to-phase filters 46 are coupled to the phase lines downstream of the inductors 44a–44c. One or more sets of phase-to-neutral filters 48 are coupled to the outputs of the phase-to-phase filters 46 and are further coupled to the neutral line 26. The phase-to-neutral filters 48 are coupled through a second set of inductors 50a–50c to the load 14 over the lines 16a–16c. Phase-to-neutral filtering components comprising capacitors 52a–52c are provided between the second set of inductors 50a–50c and the load 14 over the lines 16a–16c. Phase-to-neutral filtering components comprising capacitors 51a–52c are provided between the second set of inductors 50a–50c and the load 14.

The VSCF system 10 is operable in a normal or generating mode wherein motive power produced by the prime mover 12 is converted to electrical power which is transferred to the loads 14. During this mode of operation, the switches 28a–28c and 42a–42c are in the position shown in FIG. 1. The VSCF system 10 is also operable in a starting mode, in which case the switches 28a–28c and 42a–42c are moved to the positions opposite those shown in FIG. 1. During operation in this mode, a source of external AC power is coupled to the lines 16a–16c and 16n in place of the load 14 and power is delivered through the inductors 50a–50c, the filters 48 and 46 and the inductors 44a–44c to the rectifier 30. The resulting DC power produced by the rectifier 30 is filtered by the DC filter 34 and is converted by the inverter 38 into AC power at a controlled phase and frequency. This AC power is delivered to the feeder 20 for delivery to the generator 18. Appropriate control circuitry is provided to control the excitation of the generator 18 to cause it to operate as a motor and thereby bring the prime mover 12 up to self-sustaining speed.

Figure 2:
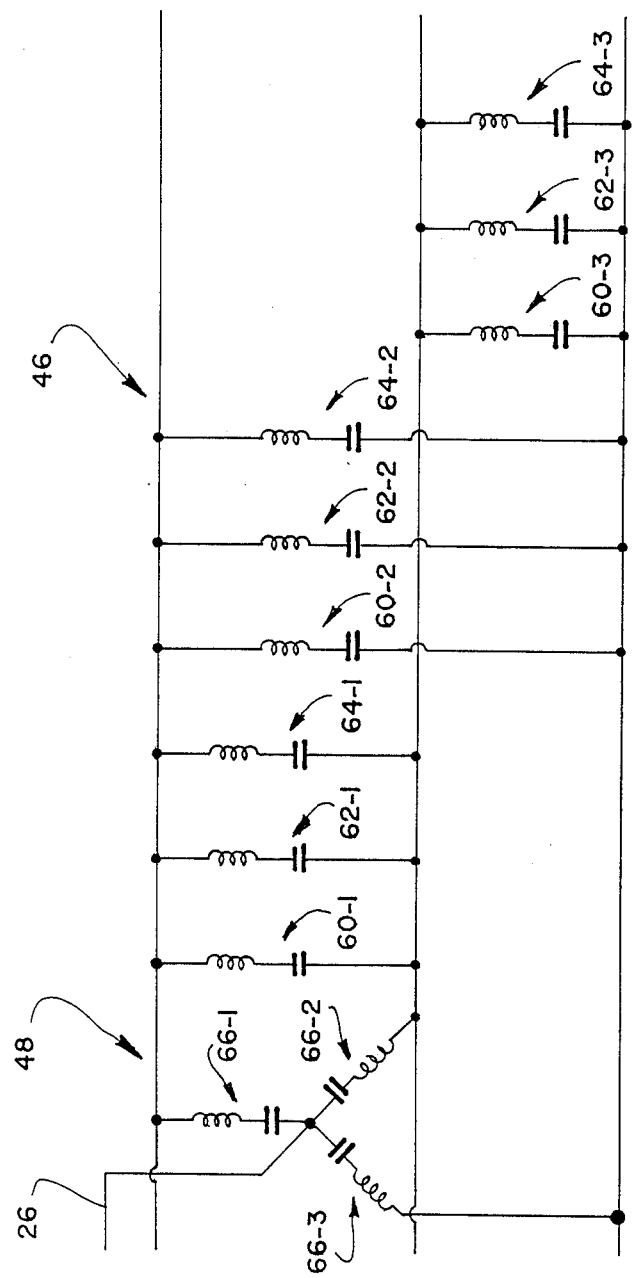
FIG. 2 is a schematic diagram of the delta and wye filters illustrated in block diagram form in FIG. 1.

Referring now to FIG. 2, the phase-to-phase filters 46 comprise three separate filters each including three impedances connected between the phase lines in a delta configuration. More specifically, the first filter comprises LC networks 60-1, 60-2 and 60-3 while the second filter comprises LC networks 62-1, 62-2 and 62-3 and the third filter comprises LC networks 64-1, 64-2 and 64-3.

In the preferred embodiment, the first filter comprising the LC network 60-1 through 60-3 is tuned to attenuate the 17th harmonic present in the power produced by the inverter 38 during operation in the generating mode. The second and third filters comprising the LC networks 62-1 through 62-3 and 64-1 through 64-3 are tuned to attenuate the 5th and 7th harmonics, respectively, in the power provided to the rectifier 30 during operation in the starting mode. It should be noted that these latter two filters do not affect operation in the generating mode, inasmuch as the inverter 38 is operated in such mode to produce power which does not have substantial harmonic content below the 14th harmonic.

The 5th, 7th and 17th harmonics are substantially balanced from line-to-line and have line-to-line phase displacements either in a first range between 90° and 150° or a second range between 210° and 270°. Thus the first through third filters are desirably of the deltaconnected type. However, if these harmonics were not substantially balanced or if the line-to-line phase displacements were outside of the first and second ranges, the first through third filters would desirably be of the wye-connected type.

The phase-to-neutral filter 48 includes three impedances comprising LC networks 66-1, 66-2 and 66-3, each connected between a phase line and the neutral line 26 so that the filter is connected in a wye configuration. In the preferred embodiment, the filter 48 is tuned to remove the 15th harmonic in the power produced by the inverter 38 during operation in the generating mode.

The first set of inductors 44a–44c, second set of inductors 50a–50c and output capacitors 52a–52c together comprise a line filter which attenuates higher harmonics (i.e., harmonics above the 17th harmonic) present in the inverter output during operation in the generating mode.

Referring again to FIG. 1, in the first embodiment of the invention, the DC link filter 34 comprises a pair of series-connected capacitors 70,72 which are connected across inputs of the inverter 38. A junction between the capacitors 70 and 72 is connected to the neutral line 26. A pair of inductors 74,76 are coupled between the DC link conductors 32a, 36a and 32b, 36b, respectively. The capacitors 70, 72 and inductors 74, 76 are selected to filter the ripple voltage produced by the rectifier 30 at three times the output frequency of the generator 18.

Figure 3:
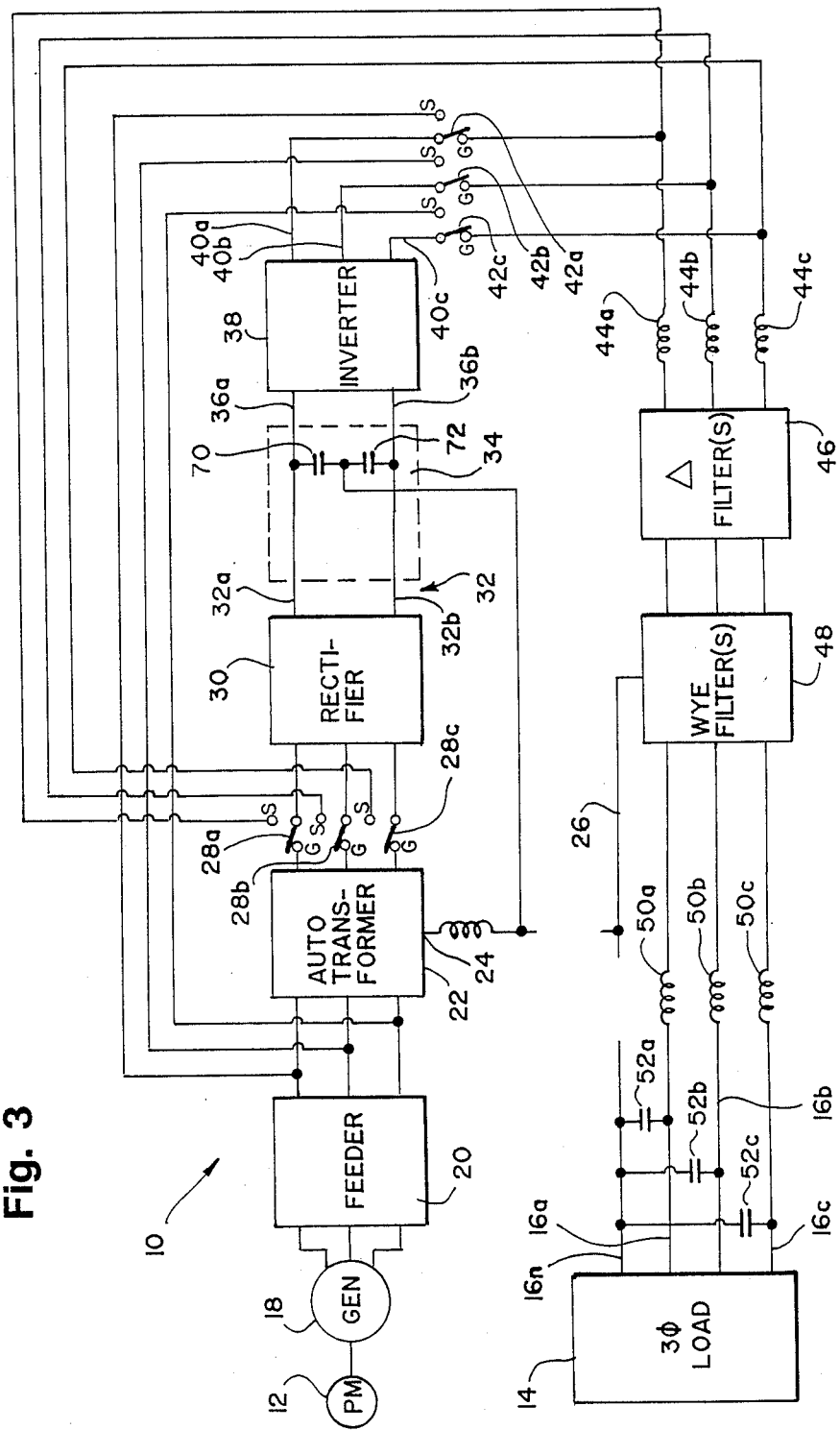
FIG. 3 is a combined schematic and block diagram similar to FIG. 1 illustrating a further embodiment of the invention.

FIG. 3 illustrates a modification to the filter system of FIG. 1 wherein the inductors 74, 76 are not used; rather, the DC link conductors 32a and 32b are directly connected to the DC link conductors 36a and 36b, respectively, and an inductor 80 is connected between the neutral connection 24 of the autotransformer 22 and the neutral line 26. In this embodiment, the capacitors 70, 72 and the inductor 80 together comprise the DC link filter 34. The current magnitude through the inductor 80 is smaller than the current magnitude through the DC link conductors 32a and 32b, and hence, the size and weight of the inductor 80 of this embodiment may be smaller than the combined size and weight of the inductors 72 and 74 of the previous embodiment. This results in a substantial savings in the overall size and weight of the VSCF system.

Figure 4:
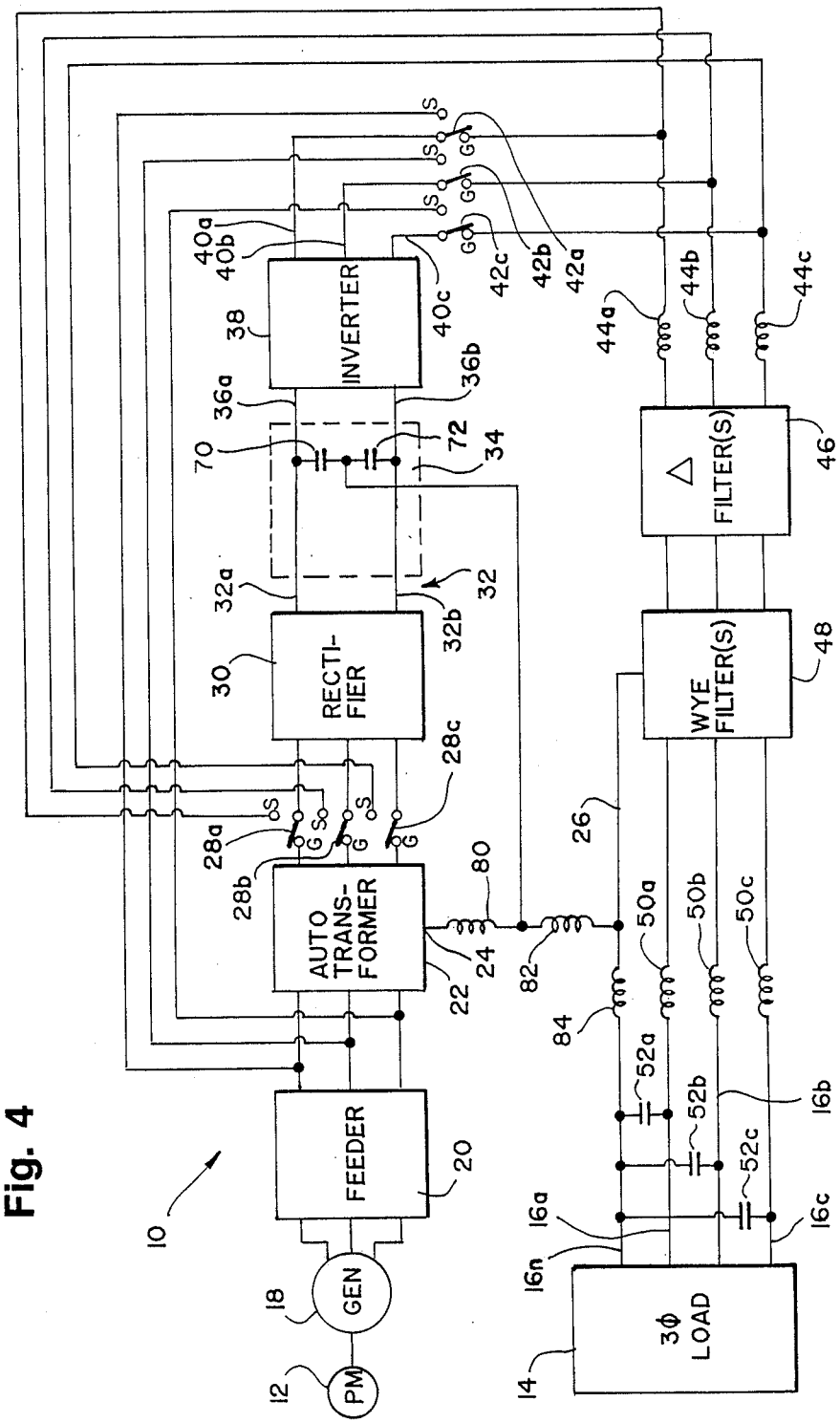
FIG. 4 is a combined schematic and block diagram similar to FIG. 1 illustrating a preferred embodiment of the invention.

FIG. 4 illustrates a modification to the circuit of FIG. 3 to further reduce the size and weight of the VSCF system. An additional inductor 82 includes a first end coupled to the junction between the capacitors 70 and 72 and a second end which is coupled to the neutral line 26. A still further inductor 84 includes a first end coupled between the neutral line 26 and the load neutral line 16n. The inductor 82 permits load fault currents to flow and presents a high impedance to AC ripple currents to prevent such currents from being introduced onto the DC link 32. This assists in reducing harmonic current flow in the inverter and filter and leads to a desirable reduction in switching device stresses and output harmonic content. The inductor 84 permits the size and weight of the inductors 44a-44c to be reduced while maintaining the same attenuation characteristics. Thus, the size and weight of the inductors 44a-44c and inductor 84 may be less than the combined size and weight of the inductors 44a-44c when used alone. This in turn leads to a desirable further decrease in the size and weight of the filter system, and hence, the VSCF system 10.

We claim:

1. A filter system for a three-phase, four-wire AC power system having an AC source which develops polyphase AC input power, means coupled to the AC source for developing a neutral on a neutral line from the AC input power, a rectifier for rectifying the AC input power to produce DC power having a ripple component and an inverter having first and second inputs coupled to the rectifier for producing three-phase inverter AC power on three phase lines, comprising:

a first filter comprising three impedances each connected between two phase lines such that the first filter is connected in a delta configuration, the three impedances attenuating a first component in the inverter AC power at a first selected frequency wherein the line-to-line phase displacement of the first component is within one of first and second ranges wherein the first range is between 90° and 150° and the second range is between 210° and 270°;

a second filter comprising three impedances each connected between a phase line and the neutral line such taht the second filter is connected in a wye configuration, the three impedances attenuating a second component in the inverter AC power at a second selected frequency wherein the line-to-line phase displacement of the second component is outside the first and second ranges; and a DC filter coupled between the rectifier and the inverter wherein the DC filter includes first and second series-connected capacitors coupled across the first and second inputs of the inverter and wherein a junction between the capacitors is coupled to the neutral line.

2. The filter system of claim 1, wherein the DC filter further includes first and second inductors coupled between the rectifier and the first and second inputs of the inverter wherein the DC filter attenuates the ripple component in the DC power.

3. The filter system of claim 1, wherein the power system is operable in a generating mode to produce AC output power or in a starting mode whereby external AC power is provided to the rectifier over the phase lines and further including a third filter coupled in parallel with the first filter in a delta configuration wherein the first and second filters attenuate frequency components present in the generating mode and the third filter attenuates a third frequency component present in the starting mode.

4. The filter system of claim 3, further including a fourth filter coupled in parallel with the first and third filters in a delta configuration wherein the fourth filter attenuates a fourth frequency component present in the starting mode.

5. A filter system for a three-phase, four-wire AC power system having an AC source which defelops polyphase AC input power, means coupled to the AC source for developing a neutral on a neutral line from the AC input power, a rectifier for rectifying the AC input power to produce DC power having a ripple component and an inverter having firsrt and second inputs coupled to the rectifier for producing three-phase inverter AC power on three phase lines, comprising:

a first filter comprising three impedances each connected between two phase lines such that the first filter is connected in a delta configuration, the three impedances attenuating a first component in the inverter AC power at a first selected frequency wherein the line-to-line phase displacement of the first compoennt is within one of first and second ranges wherein the first range is between 90° and 150° and the second range is between 210° and 270°;

a second filter comprising three impedances each connected between a phase line and the neutral line such that the second filter is connected in a wye configuration, the three impedances attenuating a second component in the inverter AC power at a second selected frequency wherein the line-to-line phase displacement of the second component is outside the first and second ranges;

a second filter comprising three impedances each connected between a phase line and th eneutral line such taht the second filter is connected in a wye configuration, the three impedances attenuating a second component in the inverter AC power at a second selected frequency wherein the line-to-line phase displacement of the second component is outside the first and second ranges; and a DC filter coupled between the rectifier and the inverter wherein the DC filter includes first and second series-connected capacitors coupled across the first and second inputs of the invertr and wherein the neutral developing means comprises a neutral forming transformer and an inductor coupled between an output of the neutral forming transformer and the neutral line.

6. The filter system of claim 5, further including second and third inductors wherein the first inductor has a first end coupled to a junction between the capacitors and a second end coupled to the neutral line and wherein the third inductor has a first end coupled to the neutral line and a second end coupled to a load neutral.

* * * * *